Sept. 5, 1950 H. W. ROCKWELL 2,521,652
STEERING MECHANISM
Filed July 22, 1946 5 Sheets-Sheet 1

Inventor:
Harvey W. Rockwell
By Thiess, Olson & Mecklenburger
Attys

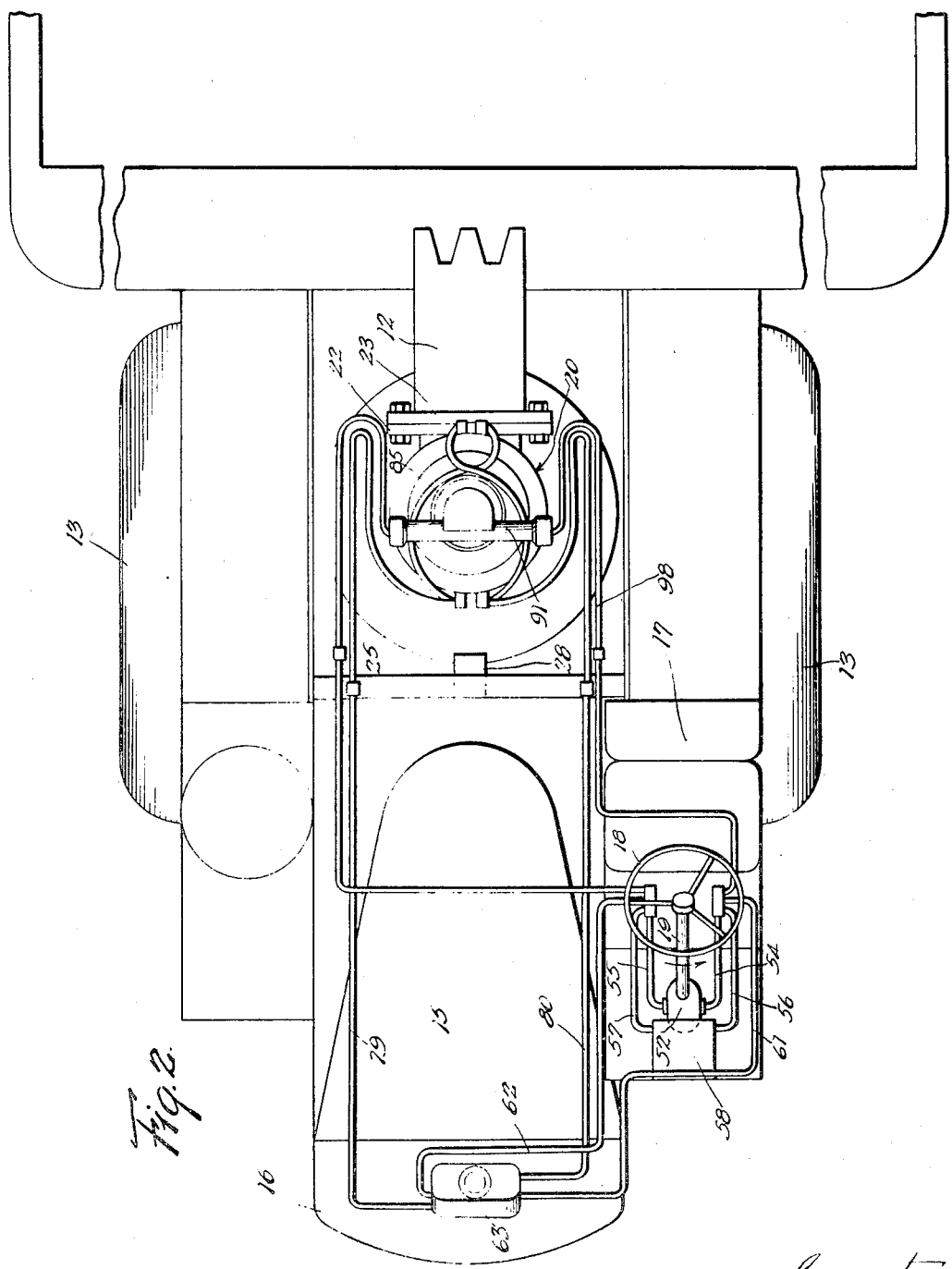

Sept. 5, 1950 H. W. ROCKWELL 2,521,652
STEERING MECHANISM
Filed July 22, 1946 5 Sheets-Sheet 3
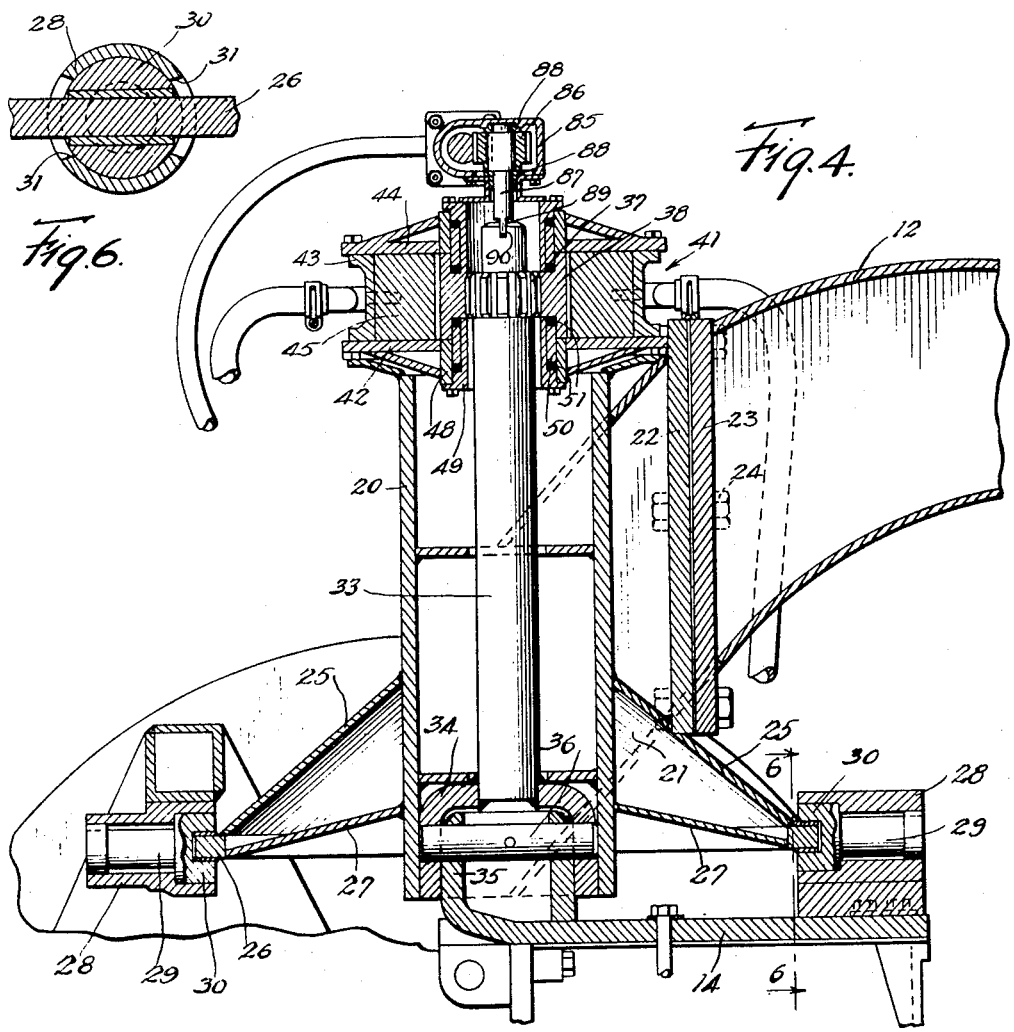
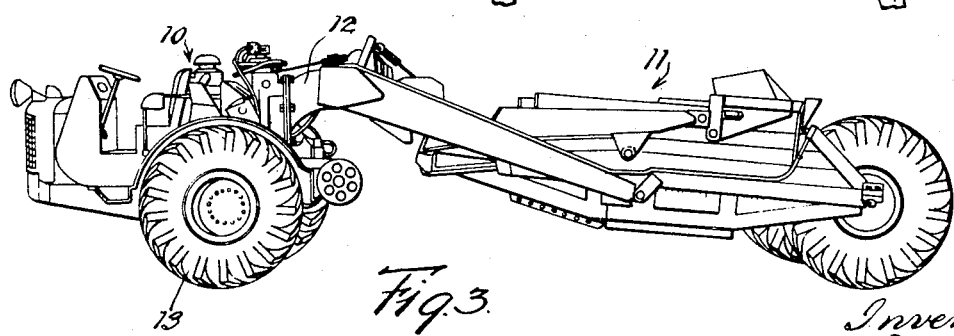
Inventor
Harvey W. Rockwell Sept. 5, 1950     H. W. ROCKWELL     2,521,652
STEERING MECHANISM
Filed July 22, 1946     5 Sheets-Sheet 4

Inventor
Harvey W. Rockwell
By Thiess, Olson & Mecklenburger
Attys

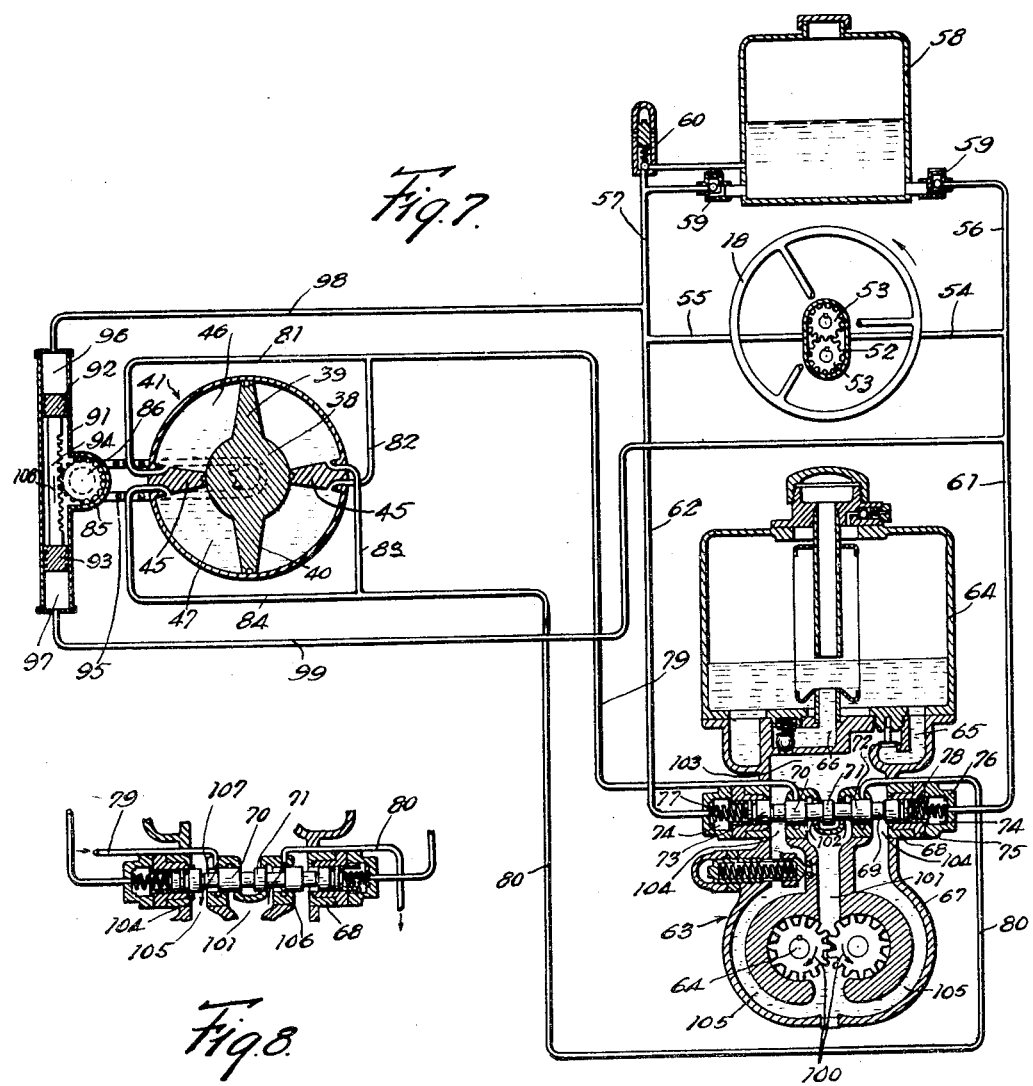

Patented Sept. 5, 1950

2,521,652

UNITED STATES PATENT OFFICE 2,521,652

STEERING MECHANISM

Harvey W. Rockwell, Cedar Rapids, Iowa, assignor to La Plant-Choate Manufacturing Co., Inc., Cedar Rapids, Iowa, a corporation of Delaware Application July 22, 1946, Serial No. 685,317

6 Claims. (Cl. 180—79.2)

This invention relates to steering mechanisms for vehicles of the type comprising a prime mover and a trailer, more particularly to steering mechanisms for heavy duty vehicles of this type in which a two-wheel prime mover is employed and the trailer is an earth mover or scraper, and the invention has for an object the provision of improved rugged, reliable steering mechanism of this character.

Although the invention is not limited thereto, it is particularly applicable to and will be shown and described in connection with two-wheel prime movers for operating earth-moving vehicles, such as scrapers, for excavating, transporting and discharging earth and similar materials. The advantages of employing two-wheel prime movers in earth moving apparatus of this type have heretofore been recognized, particularly where it is necessary or desirable to transport the material substantial distances, for example between the place of excavation and the place of discharge. The possibility of high speed transportation when employing two-wheel prime movers, thereby providing a four-wheel vehicle, as compared to the speeds obtainable when employing track-laying or crawler type tractors as the prime mover, is an important factor in economy of operation and enables substantial reductions in the time required for the completion of any particular earth-moving job. However, difficulties have been encountered in providing simple but satisfactory steering mechanisms for two-wheel prime movers that will withstand the heavy strains encountered in moving large quantities of earth over uneven and variable terrain.

In prior proposed systems for vehicles of this type, so-called fifth-wheel connections have been employed between the prime mover and the trailer, together with various motion-transmitting mechanisms, such as gears, sprockets, chains and levers, for transmitting power from suitable hydraulic rams to rotate the fifth wheel and effect turning of the prime mover relative to the trailer. Such mechanisms have been a source of considerable trouble, and it is accordingly a further object of this invention to provide a power-operated steering mechanism for vehicles of the type indicated wherein the heretofore used gears, sprockets, chains and levers are entirely eliminated and suitable power-operated devices are arranged to act directly on a rotatable steering member secured to the prime mover thereby to effect power-operated steering of the vehicle.

In carrying out the invention in one form, a vehicle including a trailer and a prime mover is provided with a steering mechanism including an element mounted on the prime mover in nonrotatable relation thereto and a housing is rigidly secured in nonrotatable relation to the trailer. The walls of the housing form a fluid-tight chamber and a reaction member connected in driving relation to the element on the prime mover is adapted for movement in the chamber upon the application of fluid pressure to the chamber on either side thereof. Rotation of the element in the housing to effect turning of the prime mover relative to the trailer is accomplished by the privision of suitable fluid pressure means for selectively applying fluid under pressure to the chamber.

More particularly, the element mounted on the trailer comprises a post disposed within a hollow pedestal carried on the prime mover in rotatable relation to the post and rigidly secured to the trailer. The housing surrounds a portion of the post on which the reaction member, in the form of a pair of vanes, is mounted and the housing which is rigid with or constitutes a part of the pedestal is so formed as to provide a pair of chambers on opposite sides of the post into each of which extends a vane carried by the post. The fluid pressure for effecting operation of the vanes comprises a hydraulic system including means for selectively applying hydraulic medium under pressure to both of the vane chambers in the housing, and the hydraulic system includes means for locking the hydraulic medium in the housing on both sides of both vanes so as to lock the post against rotation when desired. Finally, suitable follow-up means, likewise carried by and forming a part of the pedestal, are provided for controlling the hydraulic system to cause the turning movement of the vehicle to follow closely the operation of a manually controlled steering element or wheel. For a more complete understanding of the invention reference should now be had to the drawings, in which:

Fig. 2 is a top plan view of the portion of the vehicle and steering mechanism shown in Fig. 1;

Fig. 3 is an outline view on a greatly reduced scale of the two-wheel prime mover and trailer vehicle provided with steering mechanism embodying the invention;

Fig. 4 is a detail sectional view taken along the longitudinal center line of the prime mover through the steering mechanism;

Fig. 6 is a detail view taken along the lines 6—6 of Fig. 4;

Fig. 7 is a diagrammatic view of the hydraulic system employed for accomplishing power-operated steering of the prime mover shown in Fig. 1; and Fig. 8 is a fragmentary detail view of the control valve structure shown in Fig. 7, with the valve spool operated to a position for accomplishing turning of the prime mover.

Figure 1:
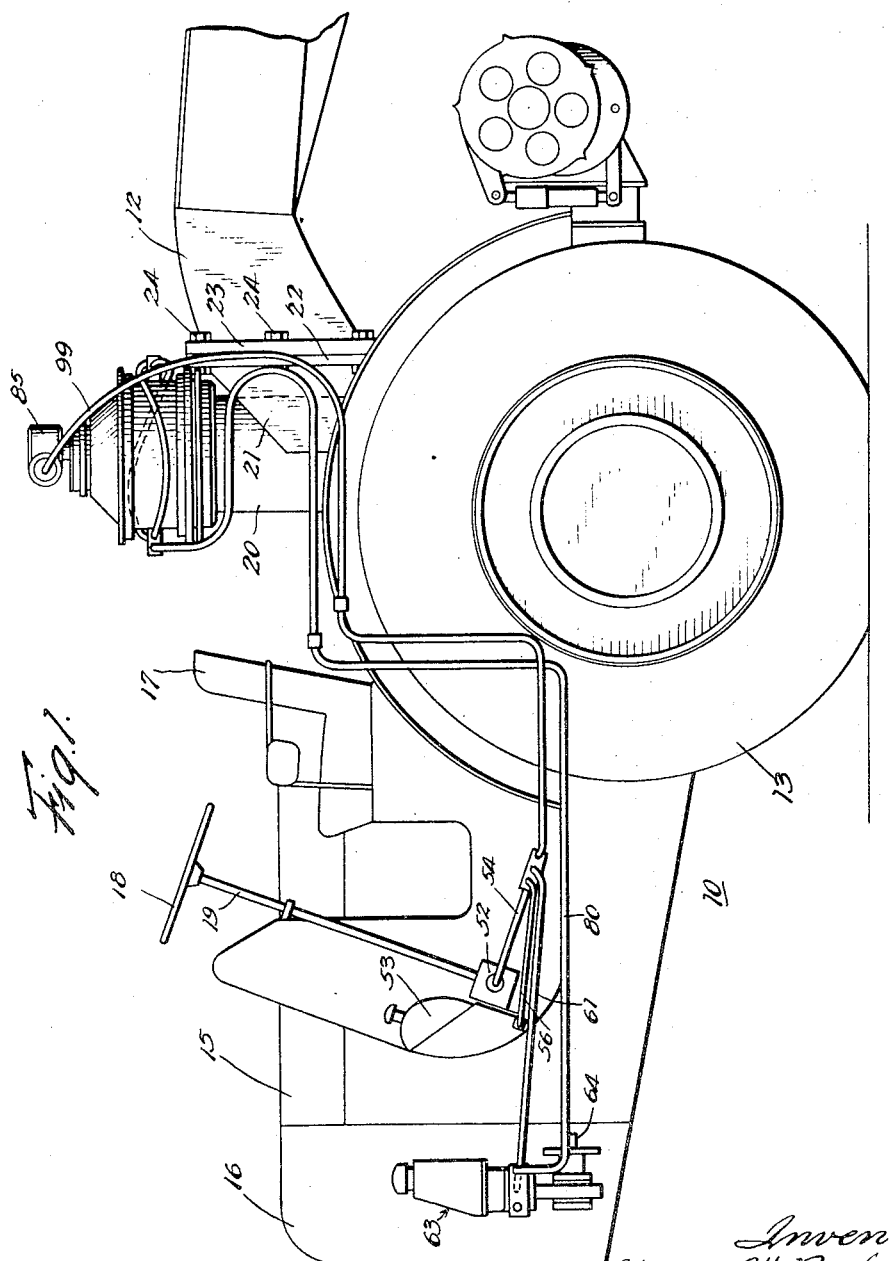
Fig. 1 is a somewhat diagrammatic elevational view of a two-wheel prime mover provided with steering mechanism embodying the present invention, only the forward portion of the trailer vehicle being shown.

Referring now to the drawings, my invention is shown (Fig. 3) as embodied in an earth mover or scraper comprising a two-wheel prime mover unit 10 and a two-wheel scraper or trailer vehicle 11 of a type well known in the art. The scraper 11 is provided at its forward end, as shown in Fig. 3, with a conventional gooseneck 12 adapted to be secured to a portion of the prime mover so that the wheels 13 of the prime mover support a portion of the weight of the scraper and the material carried thereby.

Figure 5:
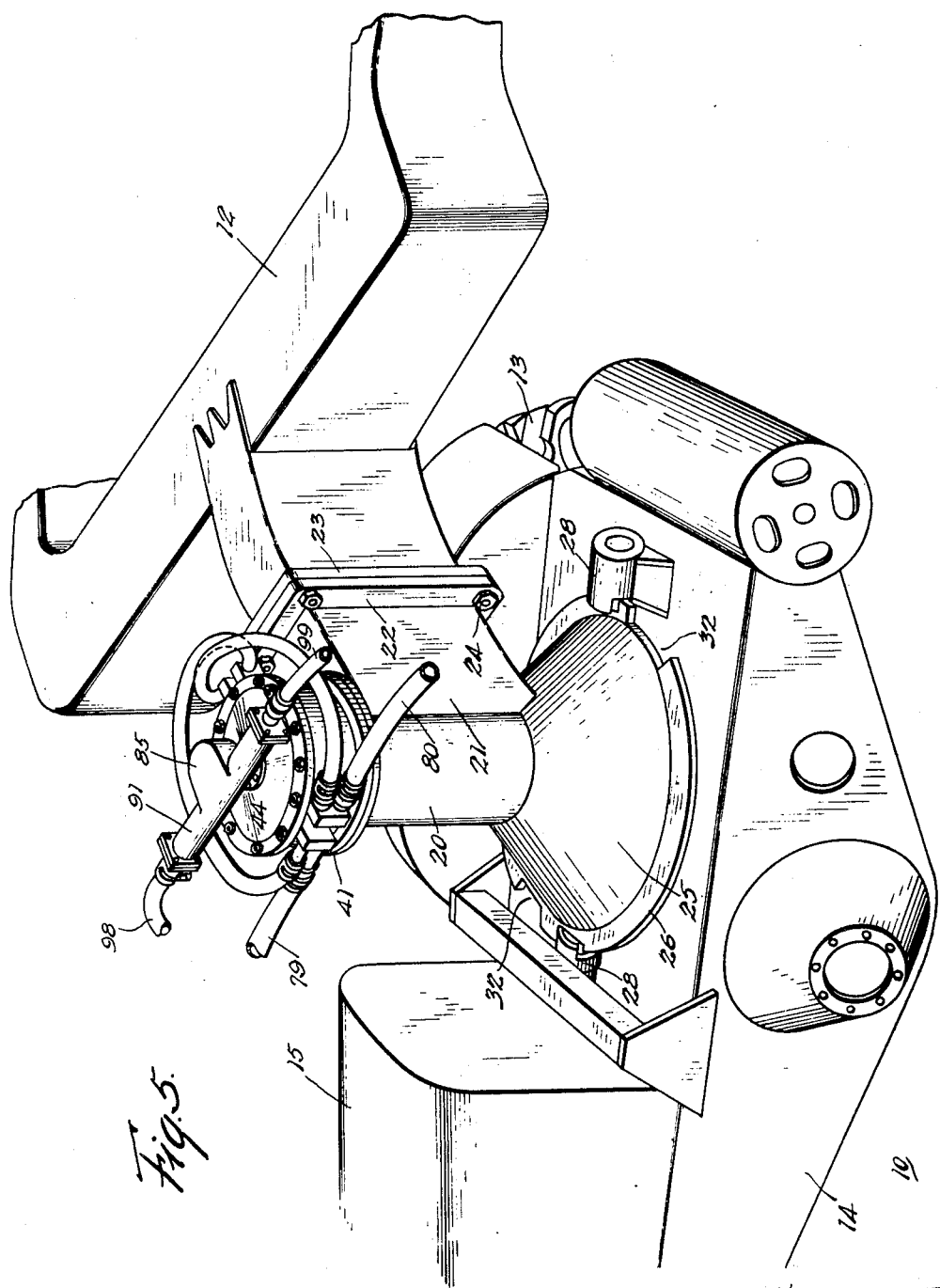
Fig. 5 is a fragmentary somewhat diagrammatic isometric view of the vehicle shown in Figs. 1 and 2 with certain parts removed in order more clearly to illustrate the structure of the steering mechanism.

In Figs. 1, 2 and 5 the two-wheel prime mover unit 10 is illustrated somewhat diagrammatically as comprising a frame 14 at the opposite sides of which the wheels 13 are supported on suitable axles (not shown), the frame carrying forwardly of the wheels 13 and within the hood 15 an engine or motor (not shown) of the usual type. At its forward end the hood 15 is provided with a grille or shell 16 which provides a suitable enclosure forwardly of the usual radiator for the cooling system of the propelling engine, in which shell is housed a portion of the hydraulic mechanism to be hereinafter described. As shown best in Figs. 1 and 2, a suitable driver's or operator's seat 17 is provided adjacent a steering wheel 18 which is secured to the upper end of a steering column 19, the operation of which will be more fully described hereinafter.

Mounted rearwardly of the engine hood 15, substantially over the axles for the wheels 13 of the prime mover 10, is a hollow pedestal 20 from which extends a neck portion 21 terminating in a flat mounting plate 22 to which the gooseneck 12 of the trailer vehicle is adapted to be secured by means of a similar mounting plate 23 and a plurality of bolts 24. Thus the pedestal 20 which is mounted for rotation with respect to the prime mover unit, as will be more fully described hereinafter, is rigidly connected to the trailer vehicle 11 so that the prime mover functions to support and propel the scraper 11.

As shown best in Figs. 4 and 5, the pedestal 20 is supported at its lower end on a conical skirt portion 25 which terminates at its lower outer end in an annular ring or flange 26. In order to provide sufficient strength and stability, a second conical skirt 27 (Fig. 4) is preferably provided with the skirt 25 and secured at its inner and outer edges to the pedestal 20 and the ring or flange 26, as for example by welding.

For supporting the pedestal 20 in rotatable relation with the frame of the prime mover 10, a pair of bearing blocks 28, 28 is suitably supported on the frame of the vehicle on opposite sides of the pedestal 20, substantially on the longitudinal center line of the prime mover. Disposed within each of the bearing blocks 28 for rotation with respect thereto is a shaft or pin 29 having an enlarged head portion 30 formed to provide a groove for receiving the annular ring or flange 26 in slidable relation, the bearing blocks 28 being provided, as shown best in Fig. 6, with oppositely disposed notches 31 for receiving the ring 26. As shown best in Fig. 5, the supporting ring or flange 26 is provided with suitable notches 32 for permitting assembly of the pedestal 20 between the bearing blocks 28 with the flange or ring 26 engaging the grooves in the pins 29, whereby limited tilting of the pedestal about the horizontal longitudinal center line of the prime mover is permitted, and rotation of the pedestal about a vertical axis is provided for.

Disposed within the hollow pedestal 20 is an upright shaft or post 33 which is supported at its lower end by a yoke-shaped bearing member 34, the outer surface of which is engaged by the hollow pedestal 20. For securing the post 33 in non-rotatable relation to the frame 14 of the prime mover 10, while at the same time permitting limited tilting movement of the post 33 with the pedestal 20 about the horizontal center line of the prime mover, a suitable supporting member or bearing 35 is provided extending upwardly from and preferably forming an integral part of the frame 14, as for example a part of the transmission case of the prime mover. A pin 36 extending through the support 35 and the opposite ends of the bearing or yoke 34 rigidly secures the post 33 and the yoke 34 against rotation about the vertical axis of the post relative to the frame of the prime mover. Inasmuch as the details of construction of the pedestal 20 and its mounting relative to the post 33 form no part of the present invention they will not be further described herein. An improved form of hitch employing the general arrangement of the post and pedestal herein shown is described and broadly claimed in a copending application of Loiell Hyler, Serial No. 685,433, filed July 22, 1946, entitled Trailer Hitch, which application is assigned to the same assignee as the present invention.

As shown best in Fig. 4 the upper end of the post 33 extends beyond the open upper end of the pedestal 20 and includes a splined portion 37 adapted to be engaged by a hub portion 38 of a vane member having a pair of outstanding vanes 39 and 40 (Fig. 7) disposed substantially diametrically opposite each other. Supported on the upper end of the pedestal 20 and rigidly secured thereto by suitable bolts (not shown) is a housing 41 which comprises a lower supporting plate 42, annular side walls 43 and a top cover plate 44. Extending inwardly from the side walls 43 is a pair of radially disposed walls 45 (Fig. 7) which divide the housing 41 into a pair of chambers 46 and 47 in which the vanes 39 and 40 are respectively disposed.

For supporting the hub member 38, on which the vanes 39 and 40 are carried in rotatable relation with respect to the housing 41 while properly sealing the housing, the bottom plate 42 of the housing is provided with a downwardly extending flange 48 to which is secured a closure member 49, a suitable bearing ring 50 and packing rings 51 being disposed within the flange 48, the hub member 38 being recessed as shown to receive a portion of the bearing ring 50 and the upper one of the sealing rings 51. Similar closure and sealing means are associated with the upper cover plate 44 and the hub member 38, as clearly illustrated in Fig. 4.

It will thus be apparent that the housing 41 and the vanes 39 and 40 carried by the post 33 form a pair of double-acting hydraulic rams so arranged that when pressure is applied to the chambers 46 and 47 on the corresponding sides of the vanes 39 and 40, the vanes will move arcuately in the housing 41 so as to rotate the post 33 relative to the pedestal 20 and effect turning of the two-wheel prime mover 10 relative to the trailer unit 11 to which the pedestal is rigidly secured.

In order to effect power operation of the post 33 and control steering of the vehicle, the prime mover unit is provided with a hydraulic system shown somewhat diagrammatically in Figs. 1, 2 and 7. In the preferred embodiment of the invention illustrated, this hydraulic system comprises a conventional reversible gear pump 52 disposed at the lower end of the steering column 19, which pump includes a plurality of intermeshing gears 53 (Fig. 7) disposed within the pump housing, one of the gears 53 being keyed to the lower end of the steering column 19 for rotation thereby and the other one of the gears 53 being journaled in the housing for intermeshing rotation with the driven gear. Suitable conduits 54 and 55 extend from opposite sides of the pump 52 and are connected to other conduits 56 and 57 which lead from a suitable tank or reservoir 58 containing a supply of fluid or hydraulic medium, such as oil. Suitable pressure-responsive check valves 59 serve to connect the conduits 56 and 57 to the reservoir 58, so as to insure that a full supply of hydraulic medium will at all times be supplied to the pump 52 in either direction of operation, and a suitable relief valve 60 is provided to guard against excessive pressures.

Likewise connected to the conduits 54 and 55 leading from opposite sides of the pump 52 is a pair of conduits 61 and 62 which lead to the opposite sides of a power driven pump and control unit 63 which, as shown best in Fig. 1, is mounted within the shell or casing 16 immediately in front of the radiator of the driving engine, the pump of the unit 63 being preferably connected through a suitable shaft 64 to a power take-off or shaft (not shown) driven by the engine.

Although various types of power-operated pumps together with suitable control valves may be employed in carrying out the present invention, I have shown, for purposes of illustration and as a preferred embodiment, a combined pump and control unit 63 of the type described and broadly claimed in my copending application Serial No. 580,121, filed February 28, 1945, and entitled Hydraulic System and Method of Operating Same, which application is assigned to the same assignee as the present invention. As shown best in Fig. 7, the combined unit 63 comprises a reservoir 64 having suitable ducts or apertures 65 and 66 leading from the bottom thereof to the power driven pump 67, through the ports and passageways of a suitable valve housing 68. Disposed within the valve housing 68 and movable longitudinally thereof is a valve spool 69 formed to provide a plurality of enlarged heads 70, 71 and 72. Disposed at each end of the valve spool 69 is a piston 73 slidable in a cylinder 74 formed within suitable fittings 75 and 76 secured to opposite ends of the valve housing 68.

The pistons 73 at their respective inner ends engage opposite ends of the valve spool 69 and are adapted to be moved in the cylinder 74 by fluid pressure supplied thereto through the conduits 61 and 62. Normally the valve spool 69 is maintained in the central position shown in Fig. 7 by means of coil springs 77 disposed within the cylinder 74 and having their inner ends supported by spring cups 78 which are flanged, as shown, to engage suitable shoulders on the fittings 75 to limit the inward movement of the spring cups.

Extending from the valve housing 68 are suitable conduits 79 and 80 (Fig. 7) which lead to the vane type double-acting ram contained in the housing 41 carried at the upper end of the pedestal 20. As shown in Fig. 7 the conduit 79 is divided adjacent the housing 41 and continues as separate conduits 81 and 82 which respectively lead to the chambers 46 and 47. Likewise the conduit 80 is divided and continues as separate conduits 83 and 84, which likewise lead to the chambers 46 and 47, respectively, but on opposite sides of the vanes 39 and 41 from the conduits 81 and 82. Thus the chambers on corresponding sides of the vanes 39 and 40 are interconnected so that the hydraulic pressure supplied thereto will at all times be equalized to effect proper operation of the vanes 39 and 40 within the housing 41.

In steering vehicles of the type to which the present invention relates, it is essential that the operation of the power steering mechanism at all times be under the precise control of the operator so that the direction and amount of steering or turning effected by the power-operated hydraulic system will at all times closely follow the operation of the steering wheel. Accordingly, before proceeding with a description of the operation of the hydraulic system by means of which hydraulic pressure is selectively applied to the vane type ram for rotating the post 33, reference will be made to the novel follow-up mechanism associated with the pedestal 20 and the post 33 in accordance with the present invention.

As best shown in Figs. 2, 4 and 5, a housing 85 is suitably supported on the upper cover plate of the housing 41 and a pinion 86 is mounted within the housing 85 on a shaft 87 journaled in suitable bearings 88. The lower end of the shaft 87 is provided with a tongue 89 adapted to engage a suitable slot 90 formed in the upper end of the rotatable steering post 33, so that the pinion 86 is directly connected to the post 33 for rotation therewith. Extending outwardly from the housing 85 and slightly offset therefrom, as shown best in Fig. 2, is a cylinder 91 within which is disposed (Fig. 7) a pair of pistons 92 and 93 connected by a rack member 94 adapted to mesh with the pinion 86, whereby the pistons 92 and 93 move within the cylinder 91 in accordance with rotation of the post 33. Although, as shown in Fig. 4, the housing 85 and cylinder 91 of the follow-up mechanism are mounted directly above and on the pedestal 20, these elements have been offset in Fig. 7 for clarity of illustration and the operating connection between the post 33 and the pinion 86 is illustrated in Fig. 7 as comprising a chain 95 operating around suitable sprockets. As shown in Fig. 7, the pistons 92 and 93 in conjunction with the cylinder 91 form expansible chambers 96 and 97 at opposite ends of the cylinder 91 and these chambers are respectively connected with the conduits 55 and 54 leading from the reversible pump 52 by means of conduits 98 and 99, whereby correlation of the power-operated steering with the movements of the wheel 18 is achieved.

It is thought that a complete understanding of the operation of my improved steering mechanism may now be had from a description of the operation, referring particularly to Fig. 7. With the valve spool 69 in the center position shown in Fig. 7 and the power-operated pump of the unit 63 being driven so that the intermeshing gears thereof rotate in the direction indicated by the arrows 100, it will be apparent that hydraulic medium under pressure will be forced through the outlet duct 101 and will pass through the ports 102 of the valve housing 68 around the centrally positioned valve head 71 into the chamber 103. From this chamber 103 the hydraulic medium returns through the end passages 104 and the passages 105 in the pump housing 67 to the inlet side of the pump. The oil is thus effectively by-passed from the outlet to the inlet of the power-driven pump without passing to the vane type hydraulic ram, and it will be observed that the conduits 79 and 80 leading from the chambers 46 and 47 of the hydraulic ram are effectively closed by the heads 70 and 72 of the valve spool 69. Thus the oil or other hydraulic medium contained in the chambers 46 and 47 on opposite sides of the vanes 39 and 40 is blocked or held therein and rotation of the post 33 and turning of the prime mover itself are prevented even though the vehicle may be passing over uneven ground and encountering rocks, depressions or similar obstacles which might tend to throw the vehicle off its steered course. Since the post 33 is thus locked no shock is transmitted from the wheels 13 of the prime mover to the steering wheel 18 thereof.

It will now be assumed that it is desired to turn the prime mover in a left-hand direction looking forwardly from the driver's seat, and consequently the steering wheel 18 will be rotated in a counterclockwise direction as indicated by the arrows in Figs. 2 and 7. Rotation of the steering wheel in this direction of course generates a pressure in the conduit 55 leading from the steering wheel actuated gear pump 52, which pressure is transmitted through the conduit 57 to the associated check valve 59, through the conduits 98 to the follow-up chamber 96, and through the conduit 62 to the pressure cylinder 74 at the left-hand end of the control valve spool 69. Since oil cannot flow through the conduit 57 due to the check valve 59 and since the piston 92 is held against movement in the cylinder 91 by the heretofore referred to locked condition of the vanes 39 and 40 and the post 33, all of the pressure generated by the counterclockwise rotation of the steering wheel 18 will be exerted on the left-hand piston 73 of the control valve so as to move the valve spool 69 in a right-hand direction to the position shown in Fig. 8.

In this position the ports 102 in the valve housing 68 are closed by the valve heads 70 and 71 so as to interrupt the bypassing connection between the outlet and the inlet of the power-driven pump. At the same time, the outlet passageway 101 leading from the power-driven pump will be connected through suitable valve ports, as indicated by the arrow 106 in Fig. 8, to the conduit 80 which is connected by way of the conduits 83 and 84 to the righthand side of the vane 39 and the left-hand side of the vane 40, as viewed in Fig. 7. Thus pressure from the power-driven pump will be applied to corresponding sides of the vanes 39 and 40 in a direction such as to rotate the post 33 in the same direction as the steering wheel 18, i. e., counterclockwise, as viewed in Fig. 7.

At the same time, the chamber 46 on the left-hand side of the vane 39 and the chamber 47 on the right-hand side of the vane 40 are connected through the conduits 81 and 82 to the conduit 79, which in turn is connected as indicated by the arrow 107 in Fig. 8 to one of the end ports 104 in the valve casing 68, and the cooperating port 105 in the pump housing 67 so that oil expelled from these portions of the chambers 46 and 47 by movement of the vanes therein can return to the inlet side of the power-driven pump.

As soon as the post 33 starts to rotate under the force imparted by the vanes 39 and 40, the pinion 86 will be correspondingly rotated so as to move the plungers 92 and 93 in the direction indicated by the arrow 108 in Fig. 7. Thus expansion of the chamber 96 and contraction of the chamber 97 will be effected and the pressure generated in the conduits 55 and 62 by rotation of the steering-wheel driven pump 52 will be relieved, pressure at the same time being built up in the conduits 99 and 61 so as to exert pressure in the chamber 74 on the right-hand end of the control valve tending to return the valve spool from the right-hand position shown in Fig. 8 to the center position shown in Fig. 7. The volume of the follow-up chambers 96 and 97 is so correlated to the capacity of the pump 52 that the spool 69 of the control valve will return to its central position whenever the position of the post 33 corresponds to the position of the steering wheel 18. Accordingly, the steering or turning of the prime mover 10 will at all times correspond precisely to the position of the steering wheel 18, thus enabling the operator properly to control the movements of the vehicle.

It will now be apparent that I have provided an improved steering mechanism in a two-wheel prime mover wherein power operation of the steering mechanism is accomplished under the precise control of the operator, the power-operating mechanism being so constructed as to eliminate all external gearing or force-transmitting arrangements, thereby providing a compact and rugged steering arrangement which will effectively carry out the desired steering operations with a minimum of attention. It will likewise be observed that all of the steering mechanism is mounted on and carried by the prime mover itself so that no special construction of the trailer vehicle is required other than that it be adapted for securement to the mounting plate 22 of the prime mover. Therefore, various types of standard trailer vehicles may be employed in connection with a single prime mover without the necessity of special design.

While I have shown a particular embodiment of my invention, it will be understood of course that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. In a vehicle including a trailer and a prime mover, the combination of an upright element pivotally mounted at one end on said prime mover for movement about an axis substantially longitudinal of said prime mover, said element being nonrotatable about its longitudinal axis, a housing including walls forming a substantially fluid-tight chamber mounted on said trailer, a movable reaction member disposed within said housing and operatively connected to said element for rotating said element with respect to said trailer upon movement of said reaction member, a steering member, means operable by said steering member for producing a controlling hydraulic pressure, power operated means for producing an operating hydraulic pressure, means selectively responsive to said controlling hydraulic pressure for applying said operating hydraulic pressure to said chamber and said reaction member to rotate said element, and follow-up means responsive to relative rotation between said prime mover and said trailer for automatically varying said controlling hydraulic pressure to cause said prime mover to follow closely the movements of said steering member.

2. In a vehicle of the class described including a trailer and a two-wheel prime mover, the combination of an upright post mounted on said prime mover in nonrotatable relation thereto, a housing surrounding at least a portion of said post and rigidly secured to said trailer, said housing including walls forming a fluid-tight arcuate chamber through which said post extends, a vane secured to said post for arcuate movement in said chamber and engaging the walls of said chamber in fluid-tight relation, a steering element on said prime mover, means operable by said steering element for producing a controlling fluid pressure, means controlled by said controlling fluid pressure for supplying fluid under high pressure to said chamber to move said vane thereby to rotate said post and steer said prime mover, and means mounted on said housing and responsive to relative rotation between said post and said housing for varying said controlling fluid pressure produced by said steering element to cause said prime mover to follow closely the movement of said steering element.

3. In a vehicle of the class described including a two-wheel prime mover and a trailer, the combination of a hollow pedestal mounted on said prime mover in rotatable relation thereto, means for securing said trailer rigidly to said pedestal, a steering post within said pedestal secured in non-rotatable relation to said prime mover whereby rotation of said post in said pedestal effects turning of said prime mover relative to said trailer, means carried by said pedestal forming an arcuate fluid-tight housing enclosing a portion of said post, a vane secured to said portion of said post and engaging the walls of said housing in fluid-tight relation for movement in said housing, and hydraulic means for selectively supplying hydraulic medium under pressure to said housing on one side of said vane and exhausting hydraulic medium from said housing on the other side of said vane to move said vane arcuately in said housing and thereby rotate said post, said last mentioned means including means selectively locking said hydraulic medium in said housing on both sides of said vane to prevent relative rotation between said post and said pedestal.

4. In a vehicle of the class described including a two-wheel prime mover and a trailer, the combination of a hollow pedestal mounted on said prime mover in rotatable relation thereto, means for securing said trailer rigidly to said pedestal for propulsion of said prime mover, a steering post within said pedestal secured in nonrotatable relation to said prime mover whereby rotation of said post in said pedestal effects turning of said prime mover relative to said trailer, means carried by said pedestal forming a fluid-tight housing enclosing a portion of said post, said housing including walls forming a pair of arcuate chambers disposed on opposite sides of said post, a pair of substantially diametrically disposed vanes secured to said portion of said post for arcuate movement within said chambers, and hydraulic means for selectively applying hydraulic medium under pressure to said chambers on corresponding sides of said vanes to rotate said post in said pedestal, said last mentioned means including means for simultaneously sealing said hydraulic medium in said chambers to lock said post against rotation in said pedestal.

5. In a vehicle of the class described including a two-wheel prime mover and a trailer, the combination of a hollow pedestal mounted on said prime mover in rotatable relation thereto, means for securing said trailer rigidly to said pedestal for propulsion by said prime mover, a steering post within said pedestal secured in nonrotatable relation to said prime mover whereby rotation of said post in said pedestal effects turning of said prime mover relative to said trailer, means carried by said pedestal forming a fluid-tight housing enclosing a portion of said post, said housing including walls forming a pair of arcuate chambers disposed on opposite sides of said post, a pair of substantially diametrically disposed vanes secured to said portion of said post for arcuate movement within said chambers, a steering element on said prime mover, means operable by said steering element for producing a controlling hydraulic pressure, power operated means for producing an operating hydraulic pressure, means selectively responsive to said controlling hydraulic pressure for applying said operating hydraulic pressure to said chambers on corresponding sides of said vanes to rotate said post in said pedestal, and follow-up means mounted on said pedestal and responsive to relative rotation between said post and said pedestal for varying said controlling hydraulic pressure to cause said prime mover to follow closely the movements of said steering element.

6. In a vehicle including a trailer and a prime mover, the combination of an upright element pivotally mounted at one end on said prime mover for movement about an axis substantially longitudinal of said prime mover, said element being nonrotatable about its longitudinal axis, a housing including walls forming a substantially fluid-tight chamber mounted on said trailer, a movable reaction member disposed within said housing and operatively connected to said element for rotating said element with respect to said trailer upon movement of said reaction member, a steering member, means operable by said steering member for producing a controlling fluid pressure, means controlled by said controlling fluid pressure for supplying fluid under high pressure to said chamber and said reaction member to rotate said element, and follow-up means responsive to relative rotation between said element and said housing for varying said controlling fluid pressure produced by said steering member to cause said prime mover to follow closely the movements of said steering member.

HARVEY W. ROCKWELL.

REFERENCES CITED

The following references are of record in the file of this patent:

UNITED STATES PATENTS

| Number | Name | Date |
|---|---|---|
| 907,105 | Clarke | Dec. 15, 1908 |
| 1,859,333 | Josephs | May 24, 1932 |
| 2,020,951 | Lemon | Nov. 12, 1935 |
| 2,252,660 | Kulikoff | Aug. 12, 1941 |
| 2,321,377 | French | June 8, 1943 |
| 2,362,262 | French | Nov. 7, 1944 |
| 2,368,202 | Clark | Jan. 30, 1945 |

Certificate of Correction

Patent No. 2,521,652 September 5, 1950

HARVEY W. ROCKWELL

It is hereby certified that error appears in the printed specification of the above numbered patent requiring correction as follows:

Column 2, line 7, for "privision" read *provision*; column 9, line 52, after the word "means" second occurrence, insert *for*; line 62, for "of" after "propulsion" read *by*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*